United States Patent
Aoki et al.

(10) Patent No.: US 10,223,577 B2
(45) Date of Patent: Mar. 5, 2019

(54) FACE IMAGE PROCESSING APPARATUS

(71) Applicants: Keishin Aoki, Aichi (JP); Shunji Ota, Aichi (JP)

(72) Inventors: Keishin Aoki, Aichi (JP); Shunji Ota, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 2 days.

(21) Appl. No.: 15/451,712

(22) Filed: Mar. 7, 2017

(65) Prior Publication Data
US 2017/0255819 A1 Sep. 7, 2017

(30) Foreign Application Priority Data
Mar. 7, 2016 (JP) ................ 2016-043063

(51) Int. Cl.
*G06K 9/00* (2006.01)
*G06T 7/10* (2017.01)
*G06T 7/174* (2017.01)
*G06K 9/20* (2006.01)

(52) U.S. Cl.
CPC ..... *G06K 9/00281* (2013.01); *G06K 9/00248* (2013.01); *G06K 9/00604* (2013.01); *G06K 9/209* (2013.01); *G06K 9/2027* (2013.01); *G06T 7/10* (2017.01); *G06T 7/174* (2017.01); *G06T 2207/10152* (2013.01)

(58) Field of Classification Search
None
See application file for complete search history.

(56) References Cited

U.S. PATENT DOCUMENTS

| 6,094,498 A | 7/2000 | Okumura | |
|---|---|---|---|
| 2009/0226049 A1* | 9/2009 | Debevec | G06K 9/00221 382/118 |
| 2017/0155852 A1* | 6/2017 | von Cramon | H04N 5/332 |
| 2017/0343338 A1* | 11/2017 | Hamaguchi | G01B 11/2504 |

FOREIGN PATENT DOCUMENTS

| JP | 06255388 A | * | 9/1994 |
|---|---|---|---|
| JP | H6-255388 A | | 9/1994 |
| JP | H9-276319 A | | 10/1997 |
| JP | 2001-22933 A | | 1/2001 |
| JP | 2011-86051 A | | 4/2011 |

* cited by examiner

*Primary Examiner* — Delomia L Gilliard
(74) *Attorney, Agent, or Firm* — Osha Liang LLP

(57) ABSTRACT

A face image processing apparatus includes: a lighting portion including a first polarizer which polarizes light in a first direction and a light emitter which emits, through the first polarizer, infrared light; an image capturing portion including a second polarizer which polarizes light in a second direction perpendicular to the first direction and an image capturing unit which captures images through the second polarizer; and an image processing portion which detects candidates of eyes using a first image captured when the lighting portion emits the infrared light and a second image captured when the lighting portion does not emit the infrared light. The image processing portion determines, as an eye, a candidate having a hyperbolic or cross shaped pattern present in the first image but not present in the second image.

4 Claims, 11 Drawing Sheets

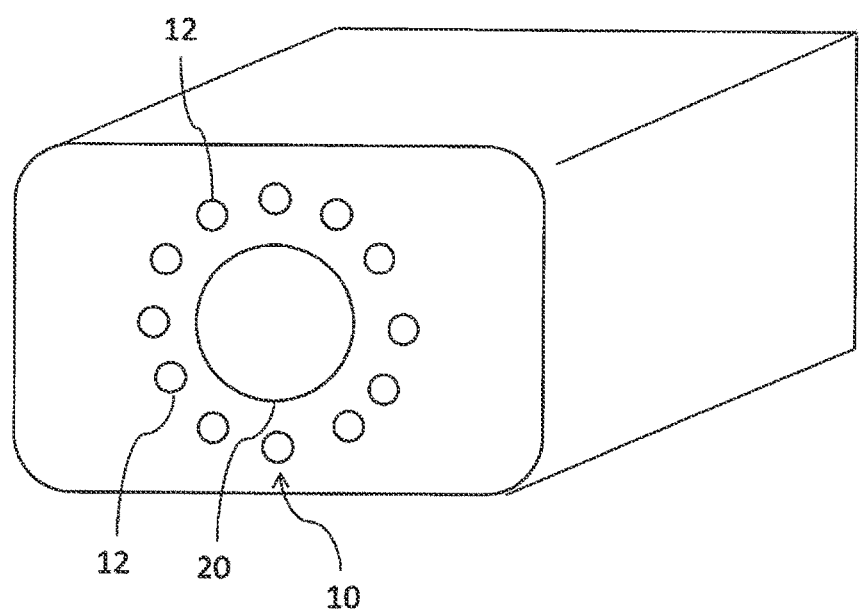

FACE IMAGE PROCESSING APPARATUS

CROSS-REFERENCES TO RELATED APPLICATIONS

This application is based upon and claims the benefit of priority from Japanese Patent Application No. 2016-043063, filed on Mar. 7, 2016, the entire contents of which are incorporated herein by reference.

FIELD

One or more embodiments of the present invention relate to a face image processing apparatus, and particularly, to a face image processing apparatus which detects positions and states of eyes based on a face image which is an image of a face of a person is captured.

BACKGROUND

In the related art, a technique is known which detects positions and states of eyes based on a face image which is an image of a face of a person is captured. For example, JP-A-2001-022933 discloses a face image processing apparatus which accurately extracts nostrils and eyes at high speed using a two-dimensional template which shows characteristics of nostrils and eyes, without being influenced by attached information. The face image processing apparatus estimates an area where candidates of the eyes are present from a face image using the two-dimensional template, and extracts the candidates of the eyes by converting the candidates of the eyes in the area into data including a plurality of brightness values. Also, the face image processing apparatus determines the eyes and positions of the eyes by setting a two-dimensional center of gravity position of pixels of the candidates of the eyes to the position of the eyes in the extracted candidates.

In addition, JP-A-H06-255388 discloses a driving state detecting apparatus which reliably detects a driving state of a driver, even when brightness is changed in accordance with various traveling circumferences by processing a captured face image of the driver. The driving state detecting apparatus generates a target face template and a target eye template for the driver by regularizing concentration of the captured image of the driver and correlatively calculating the regulated image using a standard template in which areas of a face and eyes are specified in advance. The driving state detecting apparatus performs correlation calculation with respect to the regulated image using the target templates, and detects the driving state of the driver based on the change of a correlated value. Regardless brightness of vicinity, an abnormal state such as dozing off or inattention of the driver can be reliably detected by performing the regularization and the correlation calculation.

In addition, JP-A-2011-086051 discloses an eye position recognizing apparatus which is capable of flexibly corresponding to individual differences by reducing false recognition. The eye position recognizing apparatus acquires edge images by detecting edges in a face image, for example, calculates a degree of coincidence of a convex semicircular shape of which upper eyelids are simulated, with template and a predetermined image area in the edge image, and determines an image area where the degree of coincidence is equal to or more than a threshold, as a position of the candidates of the eyes. Then, edges of the positions of the candidates of two eyes, which are simultaneously moved to up and down, are considered as blinking of eyes, and the positions of the candidates of these eyes are determined as positions of the eyes.

In addition, JP-A-H09-276319 discloses an ophthalmic stereoscopic microscope apparatus which aims to qualitatively obtain a surface shape of eyes to be examined by observing stripe marks shown in the eyes to be examined using polarization light. In the ophthalmic stereoscopic microscope apparatus, if the eyes to be examined are observed which is irradiated with light of a light source through a polarization plate, or the like acting as a polarizer, various stripe patterns can be observed in accordance with states of corneas, and shapes of the corneas by the stripe pattern are determined.

SUMMARY

One or more embodiments of the invention is to provide a face image processing apparatus which accurately detects positions or states of eyes based on a face image.

In accordance with one or more embodiments of the invention, there is provided a face image processing apparatus including: a lighting portion including a first polarizer which polarizes light in a first direction and a light emitter, through the first polarizer, which emits infrared light; an image capturing portion including a second polarizer which polarizes light in a second direction perpendicular to the first direction and an image capturing unit which captures images through the second polarizer; and an image processing portion which detects candidates of eyes using a first image captured by the image capturing portion when the lighting portion emits the infrared light and a second image captured by the image capturing portion when the lighting portion does not emit the infrared light, wherein the image processing portion determines, as an eye, a candidate of the eye having a hyperbolic shaped pattern or a cross shaped pattern present in the first image but not present in the second image.

In addition, there is provided a face image processing apparatus including: a first lighting portion including a first polarizer which polarizes light in a first direction and a first light emitter which emits, through the first polarizer, infrared light; a second lighting portion including a second light emitter which emits infrared light; an image capturing portion including a second polarizer which polarizes light in a second direction perpendicular to the first direction and an image capturing unit which captures images through the second polarizer, and an image processing portion which detects, as an eye, a hyperbolic shaped pattern or cross shaped pattern present in a first image but not present in a second image, based on the first image captured by the image capturing portion when the first lighting portion emits the infrared light and the second image captured by the image capturing portion when the second lighting portion emits the infrared light.

Accordingly, positions or states of eyes can be accurately detected by detecting characteristic patterns shown in only the eyes in the face image.

The image processing portion may generate a difference image which is a difference between the first image and the second image and detects the pattern based on the difference image.

Accordingly, influence of external light in the difference image can be compensated, and thus the position of the eyes can be further accurately detected.

The light emitter may be provided to irradiate a face of a driver with light from a front of the driver who drives a vehicle, and the image processing portion may determine that the driver looks the front, in a case in which the pattern is detected.

Accordingly, it is possible to reliably detect that the driver normally drives.

According to one or more embodiments of the invention, the face image processing apparatus, which further accurately detects the positions or the states of the eyes based on the face image, can be provided.

BRIEF DESCRIPTION OF THE DRAWINGS

FIG. 1 is an exterior view of a face image processing apparatus of a first embodiment of the invention;

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the invention will be described with reference to drawings.

First Embodiment

Figure 2A:
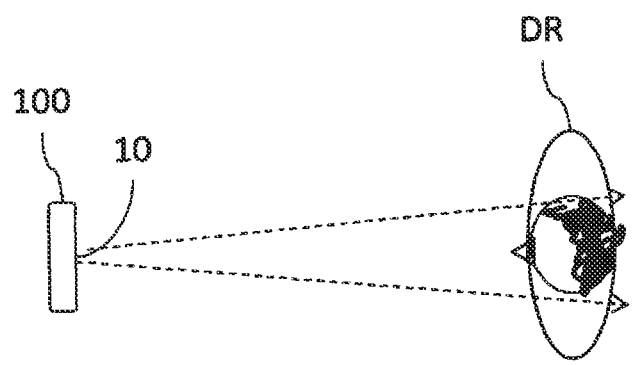
FIG. 2A is an explanatory view when seen from a top.
Figure 2B:
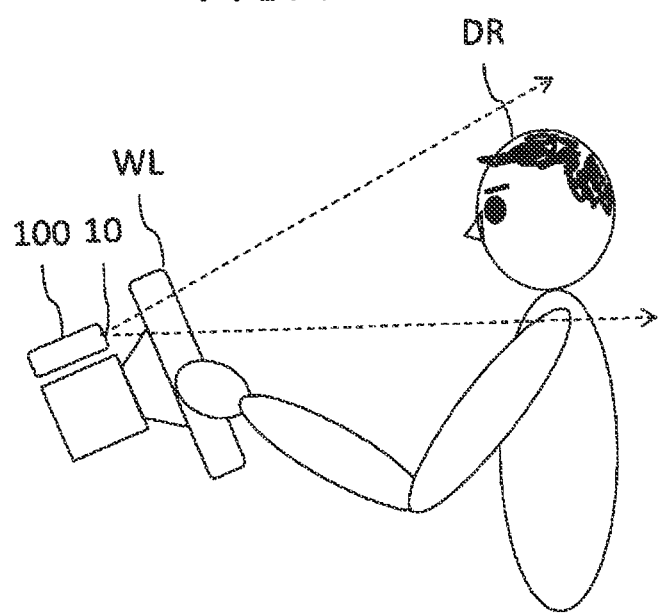
FIG. 2B is an explanatory view when seen from a side, in a case in which the face image processing apparatus of the first embodiment of the invention is provided in a vehicle.
Figure 3:
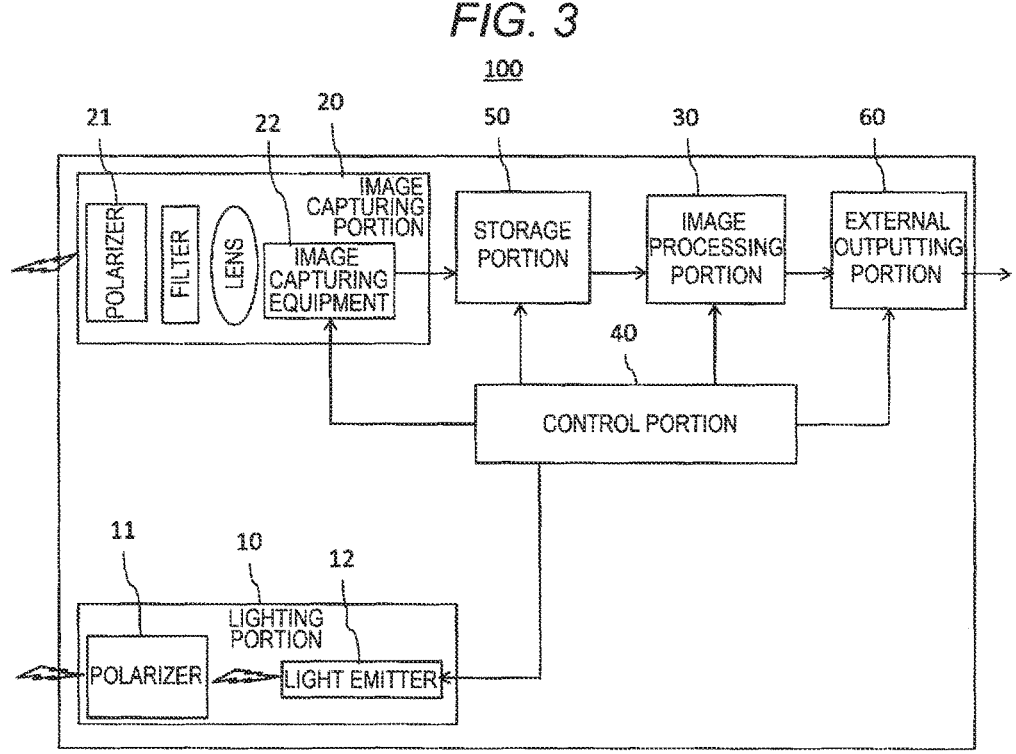
FIG. 3 is a block diagram of the face image processing apparatus of the first embodiment of the invention.

With reference to FIG. 1 to FIG. 3, a face image processing apparatus 100 in this embodiment will be described. In order to detect a driving state of a driver DR by capturing images of a face of the driver DR who drives a vehicle, the face image processing apparatus 100 is provided to irradiate light toward the face from a front of the driver DR and capture the images thereof. The face image processing apparatus 100 is provided with a lighting portion 10 and an image capturing portion 20 on a substantially cubical surface, this surface faces the driver DR and is disposed in, for example, a handle shaft portion inside a handle WL, an instrument panel part, a back mirror, or the like, and thus a face of the driver DR is irradiated with light and is captured during driving.

The face image processing apparatus 100 is provided with the image capturing portion 20 which captures an image of a face, and the lighting portion 10 which is configured with a plurality of light emitters 12 disposed to surround a vicinity of the image capturing portion 20. In the lighting portion 10 of the face image processing apparatus 100, a light emitting diode emitting infrared light as the light emitter 12 is used, and in the image capturing portion 20, a charge-coupled device (CCD) camera capable of capturing visible light and infrared light as an image capturing unit 22 is used, but of course, it is not limited thereto. The infrared light is used because a person can have night vision even when it is dark at night as well as daytime.

The lighting portion 10 includes a first polarizer 11 performing polarization in a first direction in addition to the light emitter 12, and the light emitter 12 emits infrared light to the outside through the first polarizer 11 at the time of emitting infrared light. The polarizer is a typical polarization plate which includes a polarization surface in a predetermined direction among natural light beams, and polarizes transmitted light. In this embodiment, when compared to a second direction of a second polarizer 21 included in the image capturing portion 20 to be described later, the first polarizer 11, which performs polarization in the first direction, includes a polarization surface in a vertical direction.

In addition to the image capturing unit 22, the image capturing portion 20 includes the second polarizer 21 which performs polarization in the second direction perpendicular to the first direction, that is, the second polarizer 21 which includes the polarization surface in a horizontal direction, and the image capturing unit 22 receives light from the outside through the second polarizer 21 at the time of receiving light and capturing an image. Therefore, the image capturing unit 22 polarizes and receives reflected light of infrared light which is polarized and irradiated by the light emitter 12, and polarizes and receives the reflected light of natural light.

The face image processing apparatus 100 is further provided with a storage portion 50 which stores an image captured by the image capturing portion 20, an image processing portion 30 which performs image processing in order to detect eyes, and the like based on the image stored in the storage portion 50, an external outputting portion 60 for outputting an external mechanism using a result processed by the image processing portion 30, and a control portion 40 which controls the entire portions. The storage portion 50 is, for example, a semiconductor memory, and the external outputting portion 60 is a micro computer and the control portion 40 is control logic which is processed by the micro computer.

Figure 4:
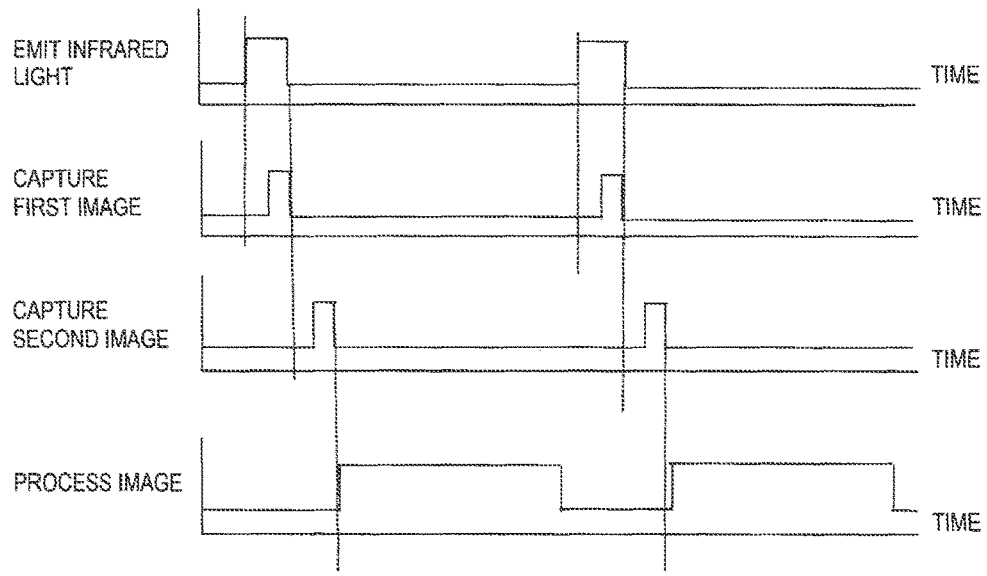
FIG. 4 is a timing chart of capturing in the face image processing apparatus of the first embodiment of the invention.

As illustrated in FIG. 4, the control portion 40 of the face image processing apparatus 100 acquires a first image by capturing the face of the driver DR with the image capturing portion 20, and stores the captured image in the storage portion 50, while the light emitter 12 of the lighting portion 10 emits infrared light and irradiates a face of the driver DR. Also, after the light emitter 12 of the lighting portion 10 is stopped to emit the light, the control portion 40 continuously allows the image capturing portion 20 to capture the face of the driver DR with only natural light, acquires a second image, and stores the image in the storage portion 50. After the first image and the second image are stored in the storage portion 50, the image processing portion 30 processes two images so as to detect eyes, and the like by a method to be described later.

Figure 5:
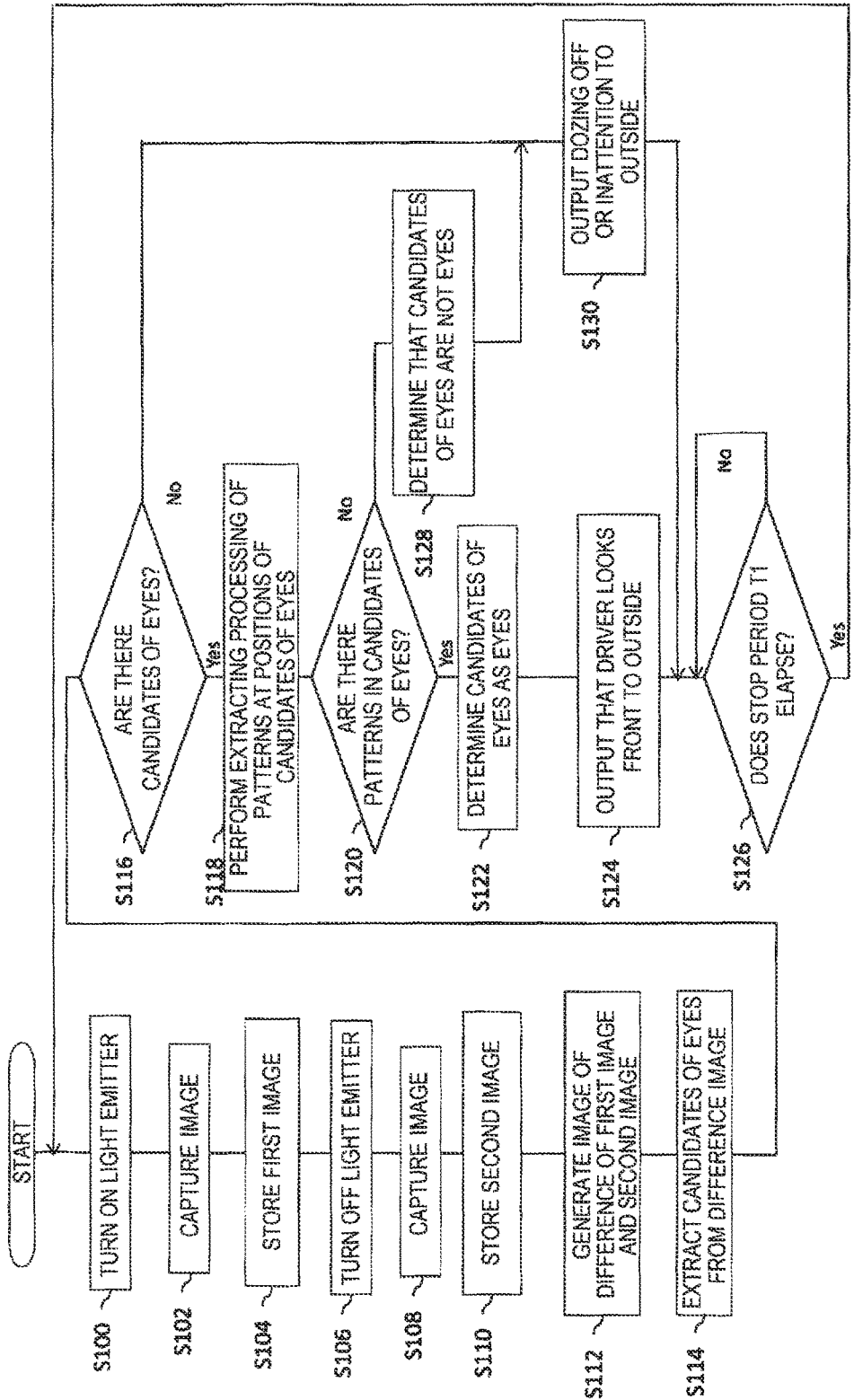
FIG. 5 is a flow chart illustrating the entire operations in the face image processing apparatus of the first embodiment of the invention.
Figure 6:
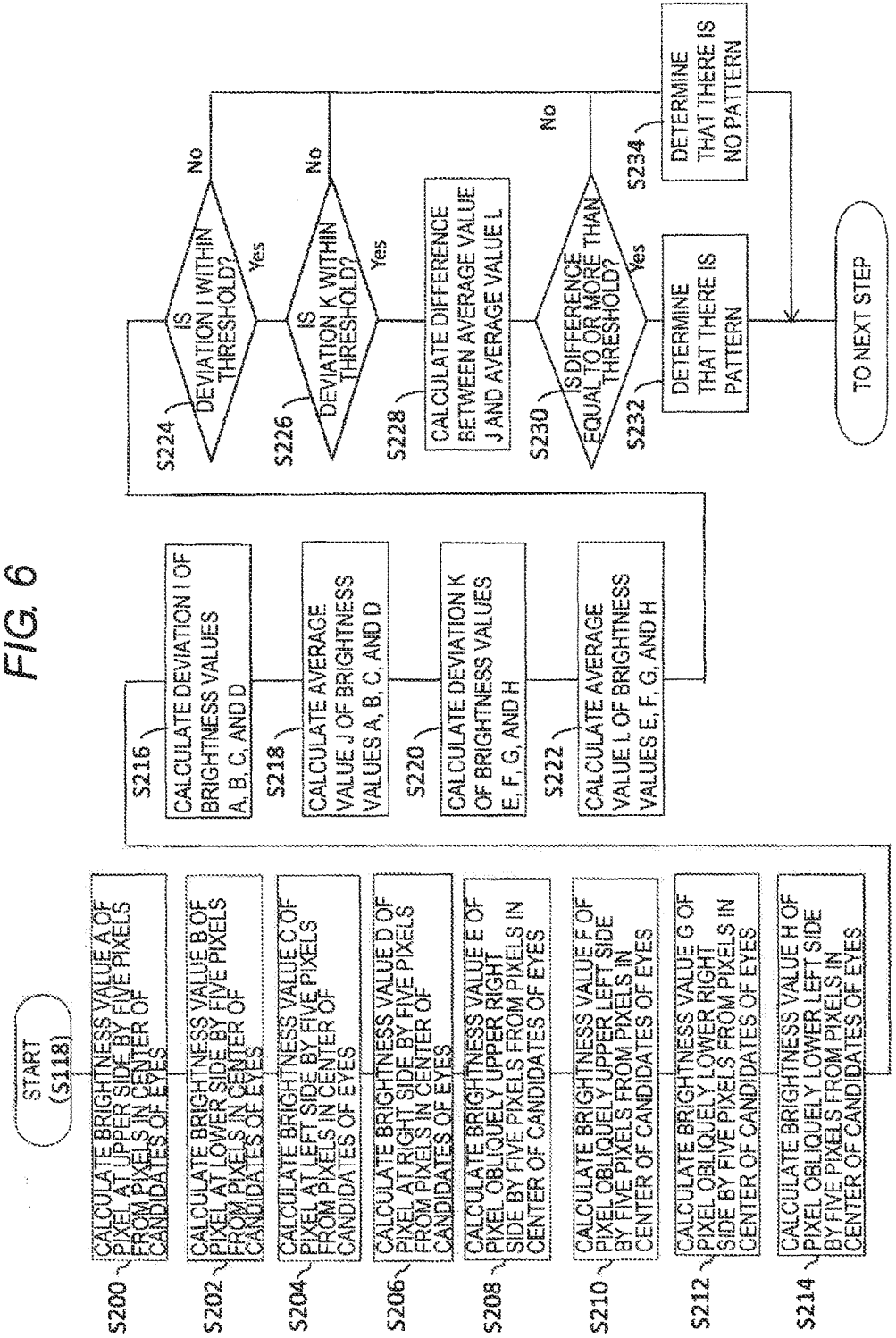
FIG. 6 is a flow chart illustrating a method of detecting patterns in the face image processing apparatus of the first embodiment of the invention.

With reference to FIG. 5 and FIG. 6, operations in the face image processing apparatus 100 will be described. Moreover, S in a flow chart means a step. The control portion 40 of the face image processing apparatus 100 irradiates the face of the driver with infrared light by turning on the light emitter 12 in S100. The control portion 40 allows the image capturing portion 20 to capture images of the face of the driver while emitting the light emitter 12 in S102. The control portion 40 allows the storage portion 50 to store the image captured by the image capturing portion 20 as the first image in S104.

Figure 7A:
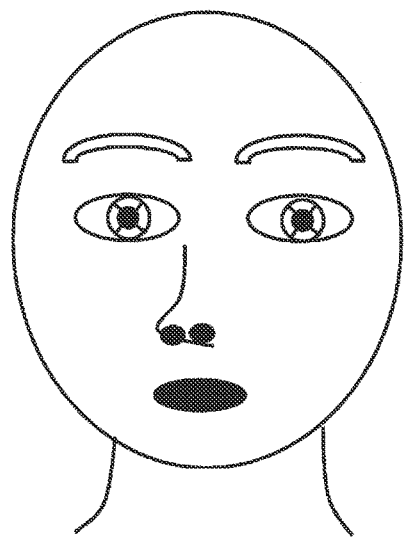
FIG. 7A is a first image and FIG. 7B is a second image, which are captured by the face image processing apparatus of the first embodiment of the invention.

Here, with reference to FIG. 7A, the first image of the face of the driver will be described. As described in the related art, in a case in which polarization light generated by the polarizer is applied with respect to the corneas of a living body and the corneas captured through a polarization filter perpendicular to this polarization is observed, by aeolotropies of the corneas, it is known that a stripe pattern of the hyperbolic shape or the cross shaped is observed in the center of the corneas. Thus, in the first image, the hyperbolic shaped patterns or the cross shaped patterns inclined at 45 degrees in the drawing are present in the corneas of the eyes of the driver as illustrated in the drawing. Inclination of the hyperbolic shaped pattern or the cross shaped pattern is not changed due to inclination of the face (eyes) of the driver, and is constant by a polarization direction (first direction and second direction). Therefore, even when the driver inclines his or her face or toward a side, for example, as long as capturing is performed when the first direction is fixed to the vertical direction and the second direction is fixed to the horizontal direction, the inclination of the hyperbolic shaped pattern or the cross shaped pattern is constant, and is not changed. Whether or not the pattern is the hyperbolic shape or the cross shape means somewhat change of a manner of the pattern according to an angle of observing a cornea having a curved surface, and it is not an essential difference.

Figure 7B:
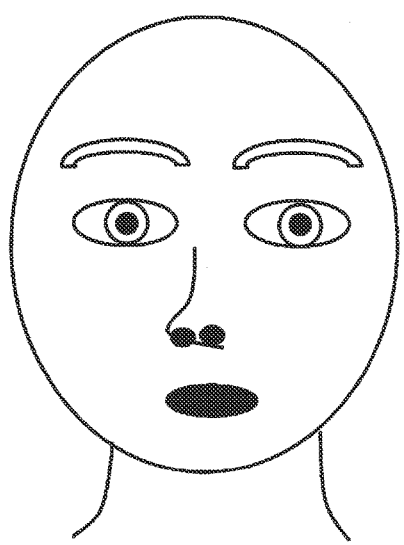

The control portion 40 turns off the light emitter 12 in S106. The control portion 40 allows the image capturing portion 20 to capture the face of the driver with only the natural light in S108. The control portion 40 allows the storage portion 50 to store the image captured by the image capturing portion 20 as the second image in S110. FIG. 7B illustrates the second image of the face of the driver, but in the second image, capturing is performed with only the natural light, and thus, characteristic hyperbolic shaped patterns or cross shaped patterns are not present in the corneas of the eyes of the driver even when capturing is performed through the polarizer 21.

Figure 8A:
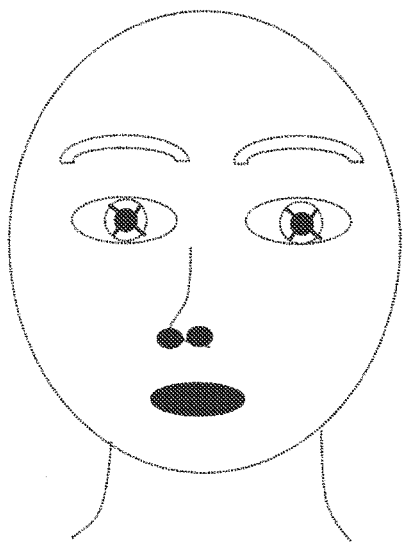
FIG. 8A is a difference image of the first image and the second image and FIG. 8B is an explanatory view of candidates of eyes in the difference image, which are captured by the face image processing apparatus of the first embodiment of the invention.

If the two images are stored in the storage portion 50, the image processing portion 30 generates a difference image of the first image and the second image in S112. The difference image is preferably obtained, from a view point that an accurate image, which is capable of compensating an image part obtained by light common to the first image and the second image, that is, reflected light of natural light which is present even when applying infrared light, can be obtained. Therefore, the difference image of this step is selectively generated, and next step may be performed from only the first image or the second image. FIG. 8A illustrates the difference image, but in the drawing, for example, rounding of dark pixels with a predetermined size or more can be set to candidates of the eye. The image processing portion 30 extracts the image part which is the candidates of the eyes from the obtained difference image, or the first image or the second image in S114.

Figure 8B:
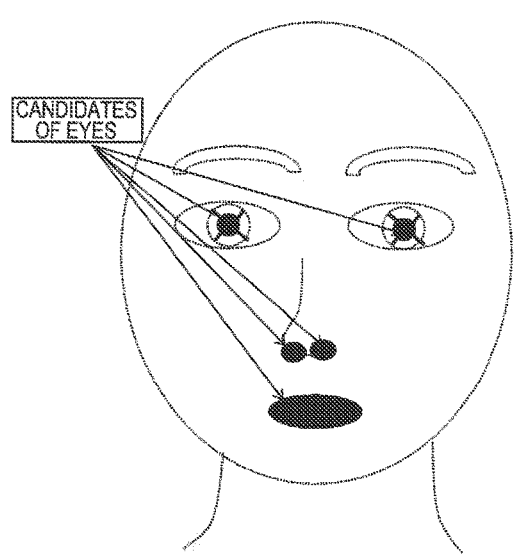

In S116, the image processing portion 30 scans whether or not there is an image part which becomes the candidate of the eye, and in a case in which there is the image part which becomes the candidate of the eye, the image processing portion performs a process of extracting patterns as illustrated in a flow chart of FIG. 6 from the image part which becomes the candidate of the eye in S118. FIG. 8B illustrates that rounding of the dark pixels with a predetermined size or more, such as eyes, nostrils of a nose, and a mouse are extracted as the candidates of the eyes. With respect to each of image parts which becomes the candidates of the eyes of these, it is determined whether or not the candidate of the eye is really an eye as follows.

Figure 10:
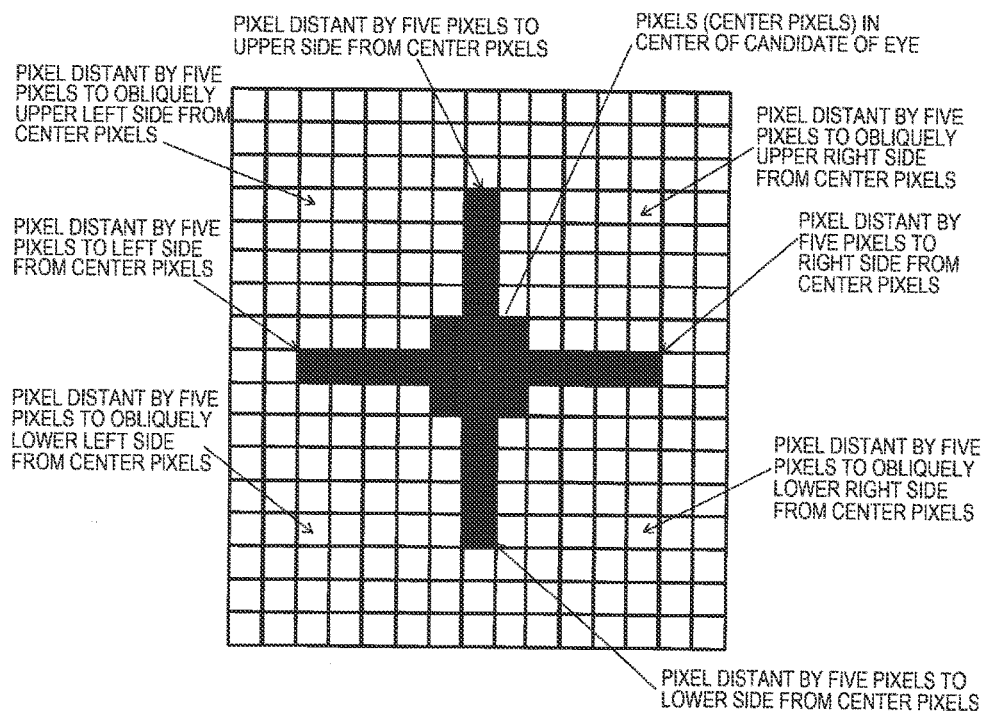
FIG. 10 is an explanatory view of a method of detecting the patterns in the face image processing apparatus of the first embodiment of the invention (pixels in a vicinity of a candidate of a certain eye among all pixels are extracted)

In S200, the image processing portion 30 calculates a brightness value A of pixels at upper side by five pixels from pixels in the center of the image part which is the candidate of the eye. Moreover, as five pixels are used in the embodiment and described, but the number of pixels of the image for photographing the corneas of a person is appropriately determined according to density of the pixels. In S202, the image processing portion 30 calculates a brightness value B of a pixel at lower side by five pixels from the pixels in the center of the image part which is the candidate of the eye. In S204, the image processing portion 30 calculates a brightness value C of the pixel at the left side by five pixels from the pixels in the center of the image part which is the candidate of the eye. In S206, the image processing portion 30 calculates the brightness value D of the pixel at the right side by five pixels from the pixels in the center of the image part which is the candidate of the eye. As illustrated in FIG. 10, pixels in upper side, lower side, right side, and left side by five pixels from the pixels in the center of the image part which is the candidate of the eye, that is, pixels distant from the vertical direction and the horizontal direction are common as dark pixels. As described above, as long as capturing is performed by fixing a direction of polarization to the first direction and the second direction, it is constant.

In S208, the image processing portion 30 calculates brightness value E of a pixel obliquely upper right side by five pixels from the pixels in the center of the image part which is the candidates of the eyes. In S210, the image processing portion 30 calculates a brightness value F of the pixel obliquely upper left side by five pixels from the pixels in the center of the image part which is the candidates of the eyes. In S212, the image processing portion 30 calculates a brightness value G of the pixel obliquely lower right side by five pixels from the pixels in the center of the image part which is the candidates of the eyes. In S214, the image processing portion 30 calculates a brightness value H of the pixel obliquely lower left side by five pixels from the pixels in the center of the image part which becomes the candidates of the eyes. As illustrated in FIG. 10, pixels respectively and obliquely upper right side, lower right side, upper left side, and lower left side by five pixels from the pixels in the center of the image part, which is the candidates of the eyes, are common as bright pixels. In the same manner, as long as capturing is performed by fixing a direction of polarization light to the first direction and the second direction, the pixels are constant.

In S216, the image processing portion 30 calculates deviation I of the brightness values A, B, C, and D. In S218, the image processing portion 30 calculates an average value J of the brightness values A, B, C, and D. In S220, the image processing portion 30 calculates deviation K of the brightness values E, F, G, and H. In S222, the image processing portion 30 calculates an average value L of the brightness values E, F, G, and H.

In S224, the image processing portion 30 examines whether or not the deviation I is within a predetermined threshold. Since the hyperbolic shaped patterns or the cross shaped patterns are always illustrated at a certain angle as described above, if deviation of brightness of a pixel at 90 degrees is large, it is considered that the hyperbolic shaped patterns or the cross shaped patterns are not shown (or abnormal value). In S226, the image processing portion 30 examines whether or not the deviation K is within a predetermined threshold in the same manner. In S228, the image processing portion 30 calculates a difference between the average value J and the average value K. Also, in S230, the image processing portion 30 examines whether or not the difference between the average value J and the average value K is equal to or more than a predetermined threshold. If the hyperbolic shaped patterns or the cross shaped patterns are shown, it is shown as a difference between an average of dark pixels and an average of bright pixels, and thus there is a difference equal to or more than a predetermined threshold.

Therefore, in a case in which the deviations I and K are within a predetermined threshold, and a difference between the average value J and the average value L is equal to or more than a predetermined threshold, in S232, the image processing portion 30 determines that the hyperbolic shaped pattern or the cross shaped pattern is present in the image part which is the candidate of the eye. Meanwhile, in a case in which the deviation I or the deviation K is not within a predetermined threshold, and the difference between the average value J and the average value L is not equal to or more than a predetermined threshold, in S234, the image processing portion 30 determines that the hyperbolic shaped pattern or the cross shaped pattern is not present in the image part which is the candidate of the eye.

Figure 9:
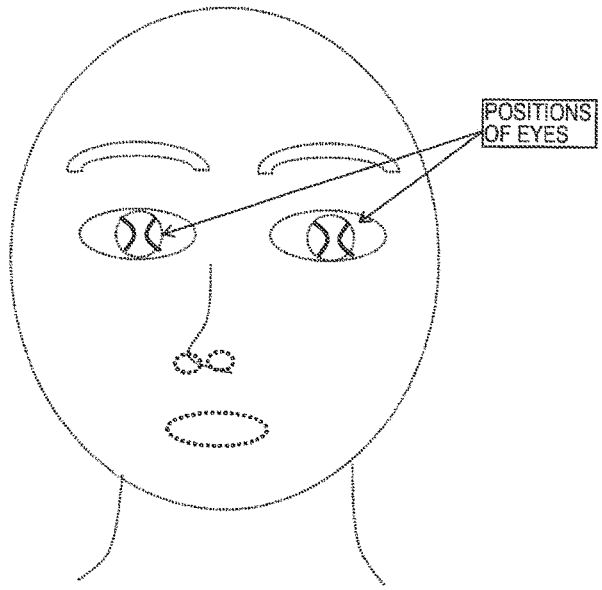
FIG. 9 is an explanatory view illustrating determination of the eyes from the difference image of the first image and the second image which are captured by the face image processing apparatus of the first embodiment of the invention.

In S120, the image processing portion 30 examines whether or not the hyperbolic shaped pattern or the cross shaped pattern is present in the image part which is the candidate of the eye, and in a case of determining that the pattern is present, in S122, such a characteristics pattern is not shown except eyes, and thus the image part which is the candidate of the eye is determined to be an image of the eye. In this case, if the face image is shown by the difference image, as illustrated in FIG. 9, only the hyperbolic shaped pattern or the cross shaped pattern shown in the cornea is shown as a difference. As described above, influence of external light in the difference image can be compensated by detecting the hyperbolic shaped patterns or the cross shaped patterns based on the difference image, and thus a position of the eyes can be accurately detected. In addition, in a case of determining that the hyperbolic shaped pattern or the cross shaped pattern is not present in the image part which is the candidate of the eye, in S128, the image processing portion 30 determines that the candidates of the eyes are not eyes.

The face image processing apparatus 100 is provided to capture images from a front of the driver DR, presence of the corneas can be recognized, so that it is determined the driver DR is in a state of looking the front, and the external outputting portion 60 outputs a result which shows the driver DR drives normally while looking the front in S124. Then, after a predetermined pause period TI, the step described above is repeated (S126). Moreover, although the candidates of the eyes are determined as eyes during repeating the step, in a case in which the candidates of the eyes are not detected in S116, or in a case in which patterns of the corneas cannot be detected in S120, the face image processing apparatus 100 determines that there is a state in which the driver DR does not look the front, for example, a state in which the driver dozes off or is inattentive, and thus the external outputting portion 60 outputs a result which shows the driver DR drives while not normally looking the front in S130.

As described above, the face image processing apparatus 100 detects the candidates of the eyes using the first image captured by the image capturing portion 20 when the lighting portion 10 emits infrared light, and the second image captured by the image capturing portion 20 when the lighting portion 10 does not emit infrared light, and determines the candidates of the eyes, which includes hyperbolic shaped patterns or cross shaped patterns present in the first image, which is not present in the second image. As described above, a position or a state of the eye can be accurately detected by detecting the characteristic pattern shown in only the eye in the face image.

Second Embodiment

Figure 11:
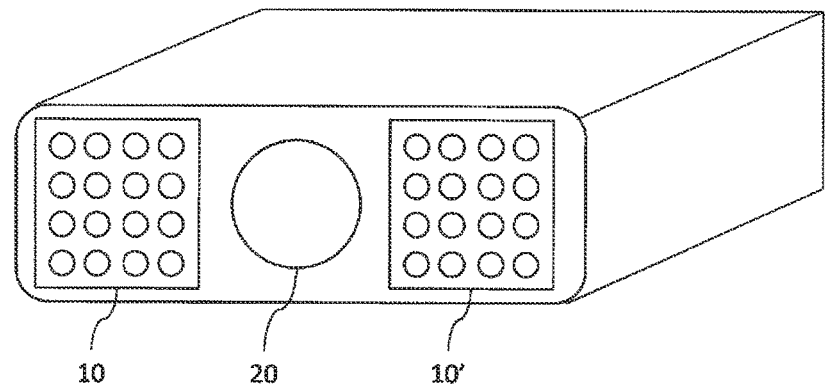
FIG. 11 is an exterior view of a face image processing apparatus of a second embodiment of the invention.
Figure 12A:
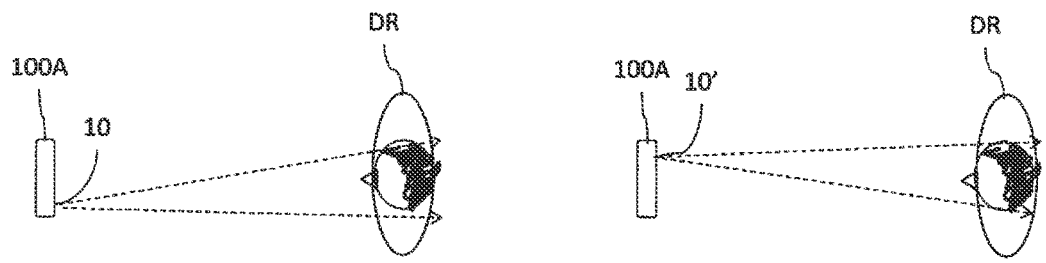
FIG. 12A is an explanatory view when seen from a top and FIG. 12B is an explanatory view when seen from a side, in a case in which the face image processing apparatus of the second embodiment of the invention is provided in a vehicle.
Figure 12B:
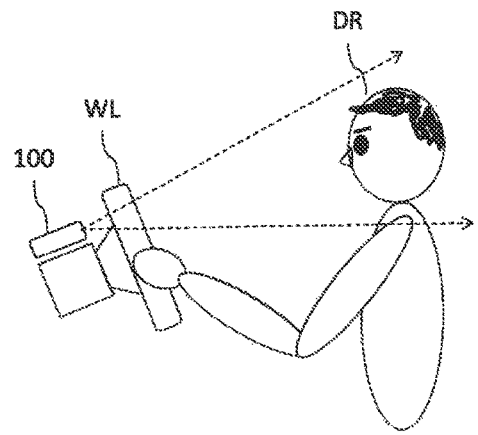
Figure 13:
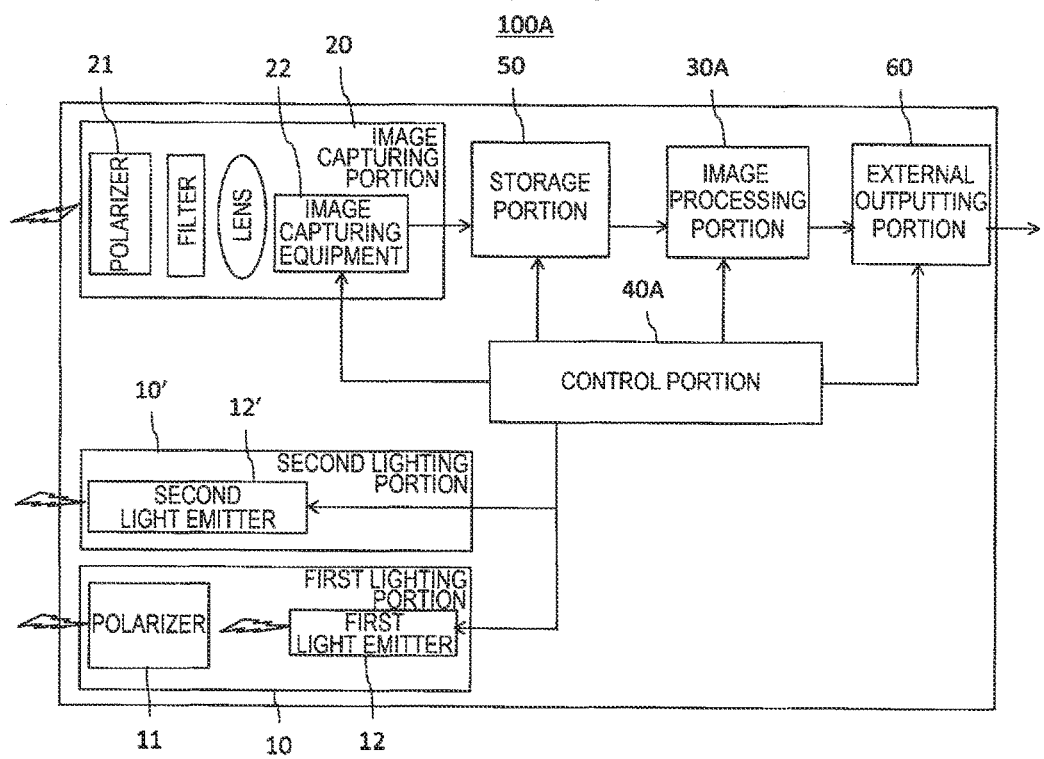
FIG. 13 is a block diagram of the face image processing apparatus of the second embodiment of the invention.

With reference to FIG. 11 to FIG. 13, a face image processing apparatus 100A in this embodiment will be described. In order to avoid redundant description, same numerals are given to same components as those of the first embodiment described above, and description will be performed focused on different parts. The face image processing apparatus 100A is provided to apply light toward a face from a front of the driver DR and performs capturing, in order to detect a driving state of the driver DR by capturing the face of the driver DR who drives a vehicle. The face image processing apparatus 100A is provided with the first lighting portion 10, a second lighting portion 10', and the image capturing portion 20 on a substantially cubical surface, this surface faces the driver DR, and is disposed in, for example, a handle shaft portion, and the like inside a handle WL, and thus the face of the driver DR is irradiated with light and is captured during driving. Moreover, in the embodiment, two lighting portions are provided on both of right and left sides of the image capturing portion 20, but it is not limited thereto, and for example, are provided annularly on in a vicinity of the image capturing portion 20 in the same manner as the first embodiment described above, and the first light emitter 12 belonging to the first lighting portion 10 and a second light emitter 12' belonging to the second lighting portion 10' may be alternatively disposed.

The first light emitter 12 and the second light emitter 12' are light emitting diodes emitting infrared light. The first lighting portion 10 includes the first light emitter 12 and the first polarizer 11 which polarizes light in the first direction, and the first light emitter 12 applies infrared light to the outside through the first polarizer 11 at the time of emitting the infrared light. Meanwhile, the second lighting portion 10' includes only the second light emitter 12', and the first light emitter 12 directly applies infrared light to the outside without polarizing the infrared light.

The image capturing portion 20 includes the image capturing unit 22 and the second polarizer 21 which polarizes light in the second direction perpendicular to the first direction, and the image capturing unit 22 receives light from the outside through the second polarizer 21 at the time of receiving the light and capturing an image. Therefore, the image capturing unit 22 polarizes and receives reflected light of the infrared light which is polarized and applied by the first light emitter 12, and polarizes and receives reflected light of the infrared light which is directly applied by the second light emitter 12' and the natural light.

Figure 14:
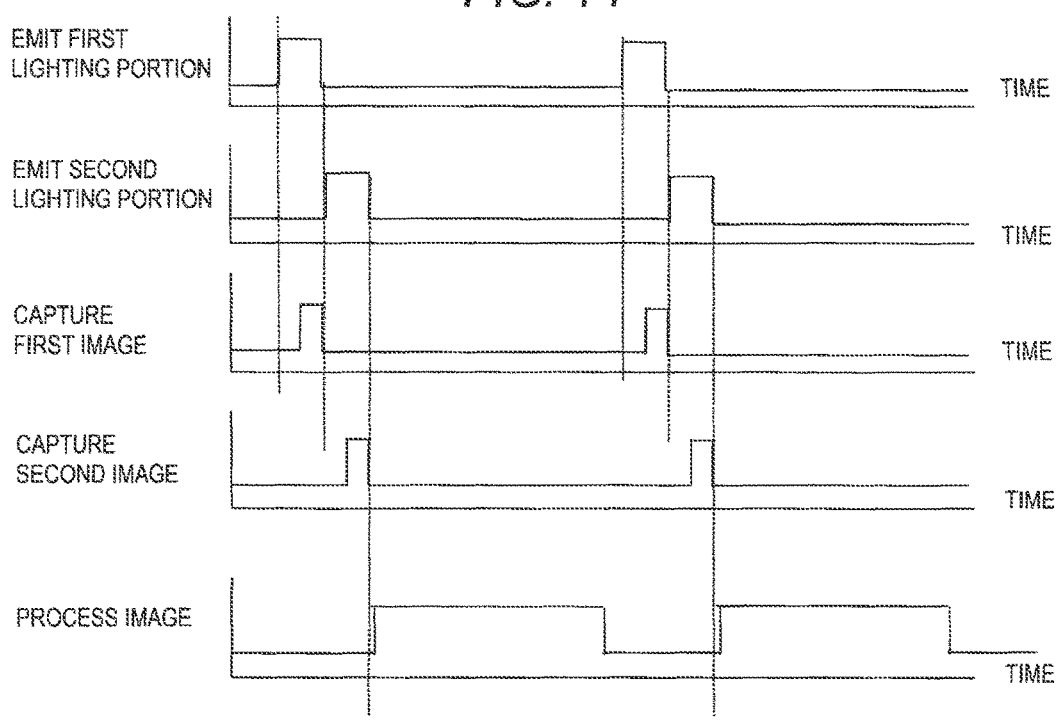
FIG. 14 is a timing chart of capturing in the face image processing apparatus of the second embodiment of the invention.

As illustrated in FIG. 14, the control portion 40A of the face image processing apparatus 100A allows the first light emitter 12 of the first lighting portion 10 to emit infrared light, acquires the first image by capturing the face of the driver DR by the image capturing portion 20 during irradiating the face of the driver DR with the light, and stores the image in the storage portion 50. Also, after the first light emitter 12 of the first lighting portion 10 is stopped to emit the light, the control portion 40A allows the second light emitter 12' of the second lighting portion 10' to emit infrared light, acquires the second image by capturing the face of the driver DR with the image capturing portion 20 during irradiating the face of the driver DR with light, and stores the image in the storage portion 50. After the first image and the second image are stored in the storage portion 50, the image processing portion 30A processes the two images, and detects eyes.

Figure 15:
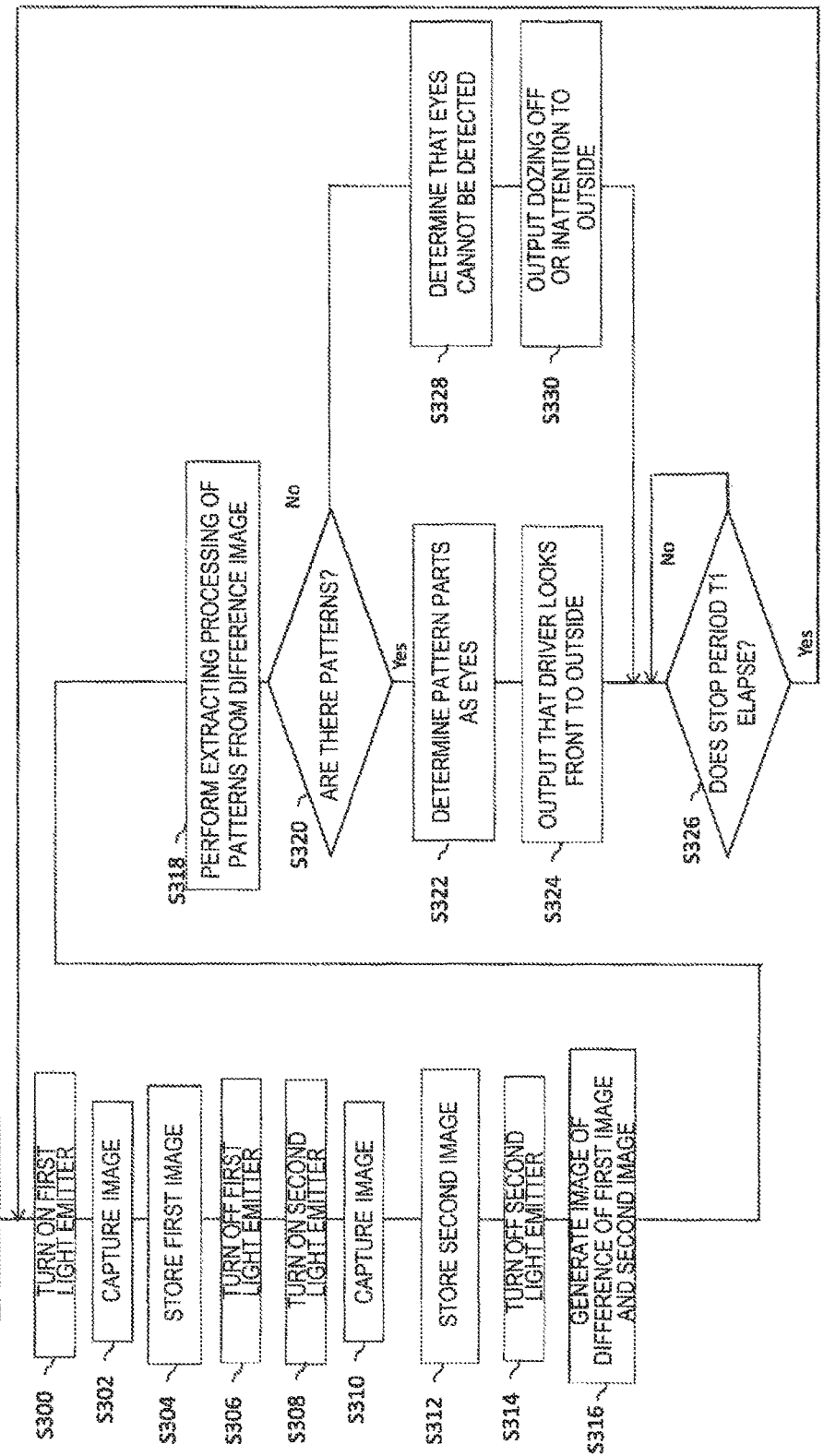
FIG. 15 is a flow chart illustrating the entire operations in the face image processing apparatus of the second embodiment of the invention.

With reference to FIG. 15, operations in the face image processing apparatus 100A will be described. The control portion 40A of the face image processing apparatus 100A allows the first light emitter 12 to be turned on and to irradiate the face of the driver with infrared light in S300. In S302, the control portion 40A allows the image capturing portion 20 to capture the face of the driver during the first light emitter 12 emitting light. In S304, the control portion 40A stores the image captured by the image capturing portion 20 in the storage portion 50 as the first image. The hyperbolic shaped patterns or the cross shaped patterns are present in the first image stored in the storage portion 50 with the same manner as that of the first image stored in the first embodiment described above.

In S306, the control portion 40A turns off the first light emitter 12. In S308, the control portion 40A irradiates the face of the driver with infrared light by turning on the second light emitter 12'. In S310, the control portion 40A allows the image capturing portion 20 to capture the face of the driver during the second light emitter 12' emitting light. In S312, the control portion 40A allows the storage portion 50 to store the image captured by the image capturing portion 20 in the second image. In the second image stored in the storage portion 50, the characteristic hyperbolic shaped patterns or cross shaped patterns are not present in the corneas of the eyes of the driver with the same manner as the second image in the first embodiment described above. In S314, the control portion 40A turns off the second light emitter 12'.

If the two images are stored in the storage portion 50, in S316, the image processing portion 30A generates a difference image of the first image and the second image. In the difference image, only the hyperbolic shaped patterns or the cross shaped patterns shown in the corneas as illustrated in FIG. 9 are shown. Here, in S318, the image processing portion 30A extracts characteristic patterns by a pattern matching method, or the like. In S320, in a case in which the image processing portion 30A examines whether or not the hyperbolic shaped pattern or the cross shaped pattern is in the difference image, it is determined that there is the pattern, and then in S322, since the characteristic patterns are not shown except the eyes, it is determined that an area where the pattern is present is an eye. In addition, in a case in which the hyperbolic shaped pattern or the cross shaped pattern is not present in the difference image, the image processing portion 30A determines that the eyes cannot be detected in S328.

The face image processing apparatus 100A is provided to capture from a front of the driver DR. If it is possible is to determine the presence of the corneas, it is determined that the driver DR is in a state of looking the front. Therefore, the external outputting portion 60 outputs a result which shows the driver DR drives while normally looking the front in S324. Also, in a predetermined pause period T1, described steps are repeated (S326). Moreover, although it is determined that the patterns are present during repeating these steps, in a case in which the patterns of the corneas cannot be detected in S320, the face image processing apparatus 100A determines a state in which the driver DR does not look the front, for example, a state in which the driver dozes off or is inattentive, and the external outputting portion 60 outputs a result which shows the driver DR does not drive while normally looking the front in S330.

As described above, the face image processing apparatus 100A detects the hyperbolic shaped patterns or the cross shaped patterns, which are not present in the second image but present in the first image, as an eye, based on the first image captured by the image capturing portion 20 using reflected light of infrared light which is polarized at the time of emitting infrared light from the first lighting portion 10, and the second image captured by the image capturing portion 20 using reflected light of infrared light which is not polarized at the time of emitting infrared light from the second lighting portion 10'. As described above, by detecting the characteristic pattern shown only in the eyes in the face image, positions or states of eyes can be accurately detected.

Moreover, the invention is not limited to the exemplified embodiments, and can be made with a configuration within a range not departing from contents of each item of claims. That is, regarding the one or more embodiments of the invention, a certain embodiment is mainly illustrated and described, but it is not departed from a range of technical spirit and scope of the one or more embodiments of the invention, and the numbers, or detailed configurations, and those skilled in the art can apply various modifications to the like with respect to the embodiments described above.

For example, in the embodiments described above, the face image of the driver of the vehicle is acquired, but a face image of other persons, such as a face image of an operator who operates important units may be acquired.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:
1. A face image processing apparatus comprising:
a lighting portion comprising a first polarizer which polarizes light in a first direction and a light emitter which emits, through the first polarizer, infrared light;

an image capturing portion comprising a second polarizer which polarizes light in a second direction perpendicular to the first direction and an image capturing unit which captures images through the second polarizer; and an image processing portion which detects candidates of eyes using a first image captured by the image capturing portion when the lighting portion emits the infrared light and a second image captured by the image capturing portion when the lighting portion does not emit the infrared light, wherein the image processing portion determines, as an eye, a candidate of the eye having a hyperbolic shaped pattern or a cross shaped pattern present in the first image but not present in the second image.

2. A face image processing apparatus comprising:

a first lighting portion comprising a first polarizer which polarizes light in a first direction and a first light emitter which emits, through the first polarizer, infrared light;

a second lighting portion comprising a second light emitter which emits infrared light;

an image capturing portion comprising a second polarizer which polarizes light in a second direction perpendicular to the first direction and an image capturing unit which captures images through the second polarizer; and an image processing portion which detects, as an eye, a hyperbolic shaped pattern or a cross shaped pattern present in a first image but not present in a second image, based on the first image captured by the image capturing portion when the first lighting portion emits the infrared light and the second image captured by the image capturing portion when the second lighting portion emits the infrared light.

3. The face image processing apparatus according to claim 1, wherein the image processing portion generates a difference image which is a difference between the first image and the second image and detects the pattern based on the difference image.

4. The face image processing apparatus according to claim 1, wherein the light emitter is provided to irradiate a face of a driver with light from a front of the driver who drives a vehicle, and wherein the image processing portion determines that the driver looks the front, in a case in which the pattern is detected.

* * * * *